United States Patent
Noh

(10) Patent No.: US 10,155,541 B2
(45) Date of Patent: Dec. 18, 2018

(54) DRIVING ASSISTANCE DEVICE

(71) Applicant: MANDO CORPORATION, Pyeongtaek-si, Gyeonggi-do (KR)

(72) Inventor: Tae Bong Noh, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/487,872

(22) Filed: Apr. 14, 2017

(65) Prior Publication Data

US 2017/0297624 A1 Oct. 19, 2017

(30) Foreign Application Priority Data

Apr. 15, 2016 (KR) .......................... 10-2016-0046377

(51) Int. Cl.
- *B62D 15/02* (2006.01)
- *B60R 1/00* (2006.01)
- *G08G 1/14* (2006.01)

(52) U.S. Cl.
CPC ............ *B62D 15/0285* (2013.01); *B60R 1/00* (2013.01); *B62D 15/021* (2013.01); *G08G 1/143* (2013.01); *B60R 2300/806* (2013.01)

(58) Field of Classification Search
CPC .... B62D 15/0285; B62D 15/021; B60R 1/00; B60R 2300/806; G08G 1/143
See application file for complete search history.

(56) References Cited

U.S. PATENT DOCUMENTS

| | | | | |
|---|---|---|---|---|
| 9,260,090 | B2* | 2/2016 | Toledo | B60T 7/22 |
| 9,457,717 | B2* | 10/2016 | Marczok | B60O 9/005 |
| 9,704,392 | B2* | 7/2017 | Wang | G08G 1/0112 |
| 2006/0080005 | A1* | 4/2006 | Lee | B60Q 1/22 |
| | | | | 701/1 |
| 2010/0283633 | A1* | 11/2010 | Becker | B60R 1/00 |
| | | | | 340/932.2 |
| 2012/0056758 | A1* | 3/2012 | Kuhlman | G08G 1/14 |
| | | | | 340/932.2 |

(Continued)

FOREIGN PATENT DOCUMENTS

| | | | |
|---|---|---|---|
| JP | 2014043140 A | * | 3/2014 |
| KR | 10-2013-0052856 A | | 5/2013 |

(Continued)

*Primary Examiner* — Tuan C To

(74) *Attorney, Agent, or Firm* — McDermott Will & Emery LLP

(57) ABSTRACT

Provided is a driving assistance device allowing a driver to recognize a path of a vehicle by outputting a location of a vehicle and a location of a target space to the driver, the location of the target space being searched for with respect to the location of the vehicle. The driving assistance device includes: a space searching unit configured to search for a target space around a vehicle with respect to the vehicle; a space information acquisition unit configured to acquire a location of the vehicle and a location of the target space; and an output unit configured to output the location of the vehicle and the location of the target space to a driver, wherein, when an automatic steering function is operated, the output unit updates and outputs a current location of the vehicle on a certain cycle, preferably, in real time until the location of the vehicle matches the location of the target space.

8 Claims, 4 Drawing Sheets

(56) References Cited

U.S. PATENT DOCUMENTS

| | | | |
|---|---|---|---|
| 2012/0087546 A1* | 4/2012 | Focke | B60R 1/00 |
| | | | 382/104 |
| 2013/0116879 A1* | 5/2013 | Huger | B62D 15/0285 |
| | | | 701/23 |
| 2013/0120161 A1* | 5/2013 | Wakabayashi | B62D 15/0295 |
| | | | 340/932.2 |
| 2013/0162829 A1* | 6/2013 | Kadowaki | B62D 15/028 |
| | | | 348/148 |
| 2014/0005904 A1* | 1/2014 | Chong | G08G 1/168 |
| | | | 701/70 |
| 2014/0136043 A1* | 5/2014 | Guarnizo Martinez | |
| | | | B60W 40/13 |
| | | | 701/23 |
| 2014/0285361 A1* | 9/2014 | Tippelhofer | G08G 1/143 |
| | | | 340/932.2 |
| 2015/0098624 A1* | 4/2015 | Sakakibara | B60R 1/00 |
| | | | 382/104 |
| 2015/0258989 A1* | 9/2015 | Okano | H04N 7/18 |
| | | | 701/1 |
| 2016/0114798 A1* | 4/2016 | Kim | B60W 30/09 |
| | | | 701/41 |
| 2016/0129939 A1* | 5/2016 | Singh | B62D 13/06 |
| | | | 701/41 |
| 2017/0015312 A1* | 1/2017 | Latotzki | B60W 30/06 |
| 2017/0219361 A1* | 8/2017 | Mays | G08G 1/0112 |
| 2017/0267288 A1* | 9/2017 | Maguire | B62D 15/0285 |
| 2018/0128638 A1* | 5/2018 | Lei | G08G 1/14 |

FOREIGN PATENT DOCUMENTS

| | | | | |
|---|---|---|---|---|
| KR | 20130054639 A | * | 5/2013 | |
| WO | WO-2011155349 A1 | * | 12/2011 | ......... B62D 15/0265 |

* cited by examiner (a)                  (b)

(a)                  (b)

Step 1: Speed up
Step 2: Constant speed
Step 3: Slow down

DRIVING ASSISTANCE DEVICE

CROSS-REFERENCE(S) TO RELATED APPLICATION

This application claims the benefit of Korean Patent Application No. 10-2016-0046377, filed on Apr. 15, 2016, in the Korean Intellectual Property Office, the disclosure of which is incorporated herein in its entirety by reference.

BACKGROUND OF THE INVENTION

Field of the Invention

The present invention relates to a driving assistance device, and more particularly, to a driving assistance device allowing a driver to recognize a path of a vehicle by outputting a location of a vehicle and a location of a target space to the driver, the location of the target space being searched for with respect to the location of the vehicle.

Description of the Related Art

Recently, since vehicles have become the necessity of modern people, new vehicles have been rapidly launched and run. Thus, various social problems such as a traffic jam and a parking problem have occurred.

In particular, due to the very serious parking problem, as vehicles are increased in confined areas, cities, and nations, parking spaces for parking of the vehicles have to be reduced. In order for solve a lack of the parking space, a parking section, which is defined such that one vehicle is parked therein, gradually becomes narrower.

In addition, when a plurality of vehicles are parked together even in a parking space having no parking section, a distance between the vehicles has to be narrow. In this case, it is difficult for a driver to visually confirm surrounding obstacles and drive a vehicle oneself to perform parking-in in a narrow parking area or parking-out from the narrow parking area.

As illustrated in FIGS. 1 and 2, a parking-out method using an existing parking-out assistance system includes a first operation of selecting a parking-out mode, a second operation of searching for a parking-out space, a third operation of automatically shifting a gear, fourth and fifth operations of controlling a movement of a vehicle toward the found parking-out space, and a sixth operation of completing parking-out.

However, in the existing parking-out assistance system, since a driver does not know an actual parking-out completion location, the driver should operate the vehicle while paying attention to obstacles approaching from the rear of a parking-out direction. Thus, in this way, although parking-out is full-automatically performed, since the driver can not know when full automatic parking-out is controlled, there has been inconvenience according to the full automatic parking-out.

The parking-out mode is illustrated in FIGS. 1 and 2, and a parking-in method using an existing parking-in assistance system includes a first operation of selecting a parking-in mode, a second operation of searching for a parking-in space, a third operation of automatically shifting a gear, fourth and fifth operations of controlling a movement of a vehicle toward the found parking-in space, and a sixth operation of completing parking-in.

Similarly, in the existing parking-out assistance system, since a driver does not know a parking-in completion location, the driver should operate the vehicle while paying attention to obstacles approaching in a parking-in direction. Thus, in this way, although parking-in is full-automatically performed, since the driver can not know when full automatic parking-in is controlled, there has been inconvenience according to the full automatic parking-in.

PRIOR ART DOCUMENT(S)

Patent Document (Patent Document 1) Korean Patent Application Publication No. 2013-0052856 (published on May 23, 2013), entitled "PARKING-OUT ASSISTANCE SYSTEM AND PARKING-OUT ASSISTANCE METHOD"

SUMMARY OF THE INVENTION

An aspect of the present invention is directed to provide a driving assistance device allowing a driver to recognize a real-time path of a vehicle and parking-in completion or parking-out completion by outputting a location of the vehicle and a location of a target space to the driver and providing notification of parking-in completion or parking-out completion when the location of the vehicle is within a preset reference range with respect to the location of the target space searched for with respect to the location of the vehicle.

According to an embodiment of the present invention, a driving assistance device includes: a space searching unit configured to search for a target space around a vehicle with respect to the vehicle; a space information acquisition unit configured to acquire a location of the vehicle and a location of the target space; and an output unit configured to output the location of the vehicle and the location of the target space to a driver, wherein, when an automatic steering function is operated, the output unit updates and outputs a current location of the vehicle on a certain cycle, preferably, in real time until the location of the vehicle matches the location of the target space.

DETAILED DESCRIPTION OF EMBODIMENTS

Hereinafter, preferred embodiments of the present invention will be described in detail with reference to the accompanying drawings.

Figure 1:
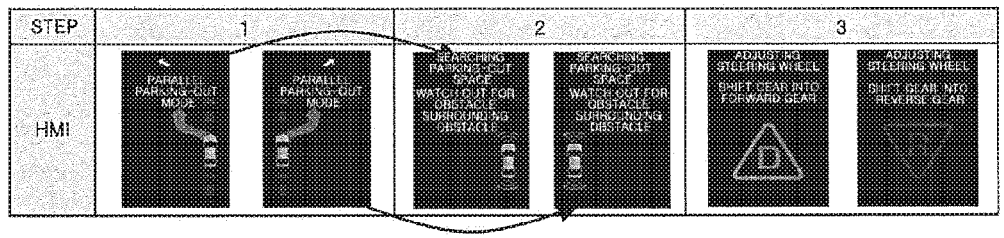
FIGS. 1 and 2 are drawings for describing a parking-out assistance method using an existing parking-out assistance system.
Figure 2:
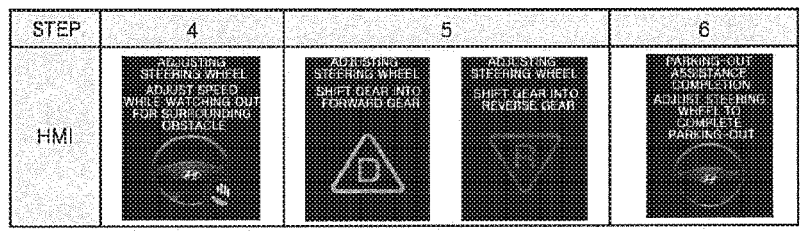
Figure 3:
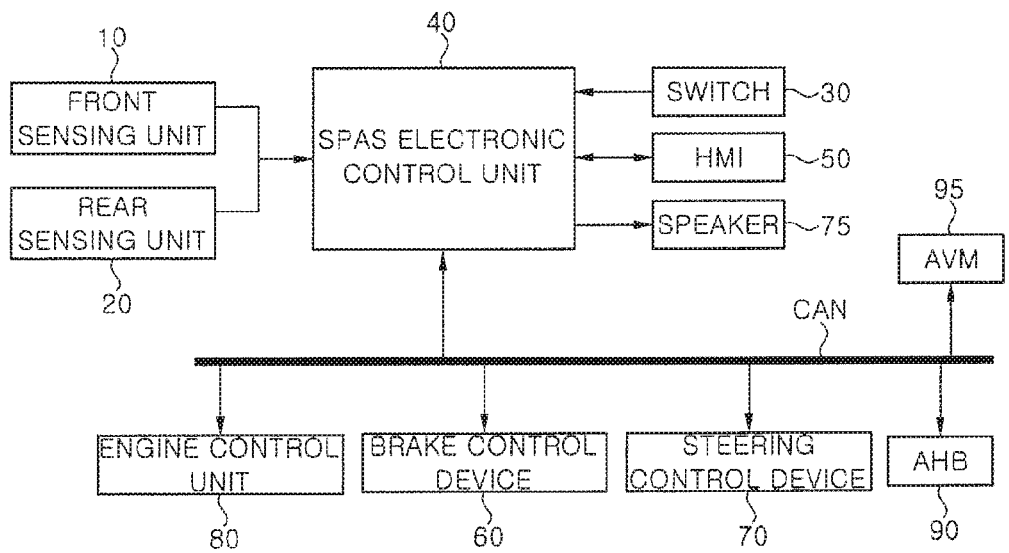
FIG. 3 is a block diagram of a driving assistance device according to an embodiment of the present invention.

FIG. 3 is a block diagram of a driving assistance device according to an embodiment of the present invention.

Referring to FIG. 3, the driving assistance device according to the embodiment of the present invention is a device that assists parking-in or parking-out of a vehicle. The driving assistance device includes an obstacle sensing unit installed on each of a front side and a rear side of a vehicle, a smart parking assistance system (SPAS) electronic control unit 40 (hereinafter, simply referred to as an "electronic control unit") connected to the obstacle sensing unit, a switch 30 configured to select automatic parking-in or automatic parking-out, a speaker 75 configured to output an alarm or notification information, and a brake control device 60, a steering control device 70, and an engine control unit 80 configured to control a behavior of the vehicle to perform automatic parking-in or automatic parking-out in a found available parking-in space or toward a found available parking-out space (hereinafter, collectively referred to as a target space) under control of the electronic control unit 40.

The obstacle sensing unit includes a front sensing unit 10 installed on the front side of the vehicle and a rear sensing unit 20 installed on the rear side of the vehicle.

Furthermore, the driving assistance device further includes an active hydraulic booster (AHB) 90 that is a vehicle regenerative brake, and an around view monitoring system (AVM) 95 that is a space searching unit configured to search for a target space around the vehicle with respect to the vehicle. The AVM 95 includes four cameras respectively installed on front, rear, right, and left sides of the vehicle and functions to assist a driver during parking-in or parking-out by grasping obstacles located on four sides of the vehicle. In particular, the electronic control unit 40 may further display surrounding image information received through the AVM 95 on a display unit (not illustrated).

In addition, the driving assistance device according to the embodiment of the present invention includes a human-machine interface (HMI) 50 configured to display a parking-in state, a parking-out state, or vehicle condition information on the display unit under control of the electronic control unit 40.

The front sensing unit 10 and the rear sensing unit 20 may be ultrasonic sensors. A distance to an object located around the vehicle may be measured by receiving echo ultrasonic signals reflected from the object through the ultrasonic sensors. The electronic control unit 40 receives sensing signals sensed through the front sensing unit 10 and the rear sensing unit 20. Although it has been described that the ultrasonic sensors are used as the front sensing unit 10 and the rear sensing unit 20, a radar may also be used The front sensing unit 10 may be installed at each of a center and corners of the front side of the vehicle and may be provided in plurality. Similarly, the rear sensing unit 20 may be installed at each of a center and corners of the rear side of the vehicle and may be provided in plurality.

The electronic control unit 40 calculates coordinates of a location of a vehicle and an available parking-in space or an available parking-out space searched for with respect to the location of the vehicle, acquires a parking-in completion location or a parking-out completion location (collectively referred to as a location of a target space), and displays the parking-in completion location or the parking-out completion location on the display unit. At this time, when an automatic steering function is operated, the electronic control unit 40 updates and displays a current location of the vehicle on a certain cycle, preferably, in real time until the location of the vehicle matches the location of the target space.

In addition, the electronic control unit 40 may output the current location of the vehicle and the location of the target space so as to overlap a top view image displayed on a display screen. When the location of the vehicle is within a preset reference range with respect to the location of the target space, the electronic control unit 40 outputs movement completion notification. When the location of the vehicle matches the location of the target space, the electronic control unit 40 changes and outputs a color of an indicator indicating the location of the target space on the display screen. Therefore, the driver may know when full automatic parking-in or full automatic parking-out is completed, thereby solving existing inconvenience according to full automatic parking-in or full automatic parking-out.

Here, the parking-in completion location is set by designating four corner points of the vehicle and connecting the designated four corner points with a line within coordinate values corresponding to a size of the found available parking-in space. The parking-out completion location is set by designating four corner points of the vehicle within coordinate values corresponding to a size of the found available parking-out space and connecting the designated four corner points with a line. In particular, in the case of the parking-out completion location, a point where the vehicle is moved by a certain distance may be searched for as the available parking-out space, or a point where a distance to an obstacle around the vehicle is within a preset reference distance after parking-out from a parking space may be searched for as the available parking-out space. In the present embodiment, the parking-in completion location or the parking-out completion location is displayed by using a square box, but the present invention is not limited to a shape thereof.

In addition, the parking-in completion location may be defined within coordinate values with respect to a size of the found available parking-in space. The point where the distance to the obstacle around the vehicle is within the preset reference distance after parking-out from a parking space may be searched for as the available parking-out space and the parking-out completion position may be defined within coordinate values corresponding to the size of the found available parking-out space.

Furthermore, the electronic control unit 40 calculates a current location (coordinate information) of a vehicle moved to the parking-in completion location or the parking-out completion location and updates the calculated current location on the display unit.

That is, the electronic control unit 40 may calculate coordinate information on a vehicle through a vehicle model by using sensor signals (for example, a wheel pulse and a steering angle) of the vehicle moved to the parking-in completion location or the parking-out completion location as an input during assistance of automatic parking-in or automatic parking-out.

More specifically, the electronic control unit 40 internally has a map with respect to a wheel speed of the vehicle caused by a steering angle signal. The electronic control unit 40 calculates coordinate information (x, y, and theta ($\theta$)) of the vehicle through the vehicle model based on a "bicycle model" by calculating forward/backward travel distance information on the vehicle from a wheel pulse signal and using the calculated forward/backward travel distance information as an input. At this time, an x value of the coordinate information on the vehicle is calculated by using the wheel pulse signal, and a y vale and a $\theta$ value are calculated by using the wheel pulse signal and the steering angle signal.

Figure 7:
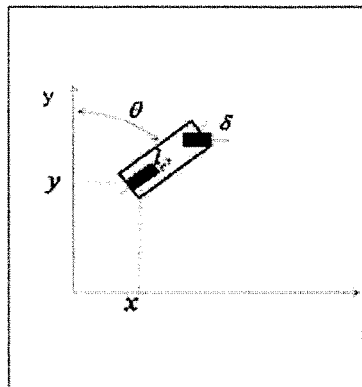
FIG. 7 illustrates a diagram showing coordinate information of a vehicle and a corresponding model formula for calculating coordinate information (x, y, and theta ($\theta$)) of the vehicle.

More specifically, the coordinate information (x, y, and $\theta$) on the vehicle is estimated by basically using a "bicycle model" as a "kinetic model following an Ackerman geometry". In order to apply the "Ackerman geometry model", a current location (x, y, and θ) of the vehicle is calculated and output by using a road wheel angle, that is, a rotation angle, a vehicle or wheel speed, and a non-driven wheel travel signal as an input, the road wheel angle reflecting a gear ratio of a vehicle rather than a steering wheel angle of a driver. Since it is necessary to control the current location (x, y, and θ) of the vehicle through a displacement and an angle change of the vehicle, a model formula is shown in FIG. 7 in a non-holonomic system condition:

Two assumptions were made for the model formula. Since a parking system operates in a low speed condition of 10 kph or less, a sidle slip angle (β) may not occur or may be negligibly very small when the vehicle turns, and only a front-wheel steering angle input influences the road wheel angle of the vehicle. Under the assumptions described above, the current location (x, y, θ) of the vehicle may be calculated on a global coordinate by using the steering angle and the wheel pulse of the vehicle as an input and be used in control.

In the present embodiment, the wheel pulse signal and the steering angle signal may be received through a sensor installed in the vehicle. However, the wheel pulse signal and the steering angle signal may also be received through an electronic control unit (not illustrated) configured to perform electronic control by using the wheel pulse signal and the steering angle signal.

In addition, the electronic control unit 40 may additionally provide notification of a preset alarm when a distance to an obstacle around a vehicle is within a preset reference distance while the vehicle is moved to the parking-in completion location or the parking-out completion location.

Furthermore, in a case where the location of the vehicle is close to the parking-in completion location or the parking-out completion location, although the aforementioned location of the vehicle is not within a preset reference range, the electronic control unit 40 may change the current location of the vehicle into the parking-in completion location or the parking-out completion location and provide notification of parking-in completion or parking-out completion when the distance to the obstacle around the vehicle is within the preset reference distance.

Although it has been described that the parking-in completion location or the parking-out completion location are changed, in a case where the aforementioned location of the vehicle is close to the parking-in completion location or the parking-out completion location and deviates from the preset reference range, the location of the vehicle may also be changed into the parking-in completion location or the parking-out completion location when the distance to the obstacle around the vehicle is within the preset reference distance.

The case where the location of the vehicle is close to the parking-in completion location or the parking-out completion location means a case where coordinate values corresponding to the location of the vehicle are placed within a predetermined boundary from coordinate values corresponding to the parking-in completion location or the parking-out completion location.

A driving assistance method using the driving assistance device as configured above will be described with reference to FIG. 3.

Figure 4:
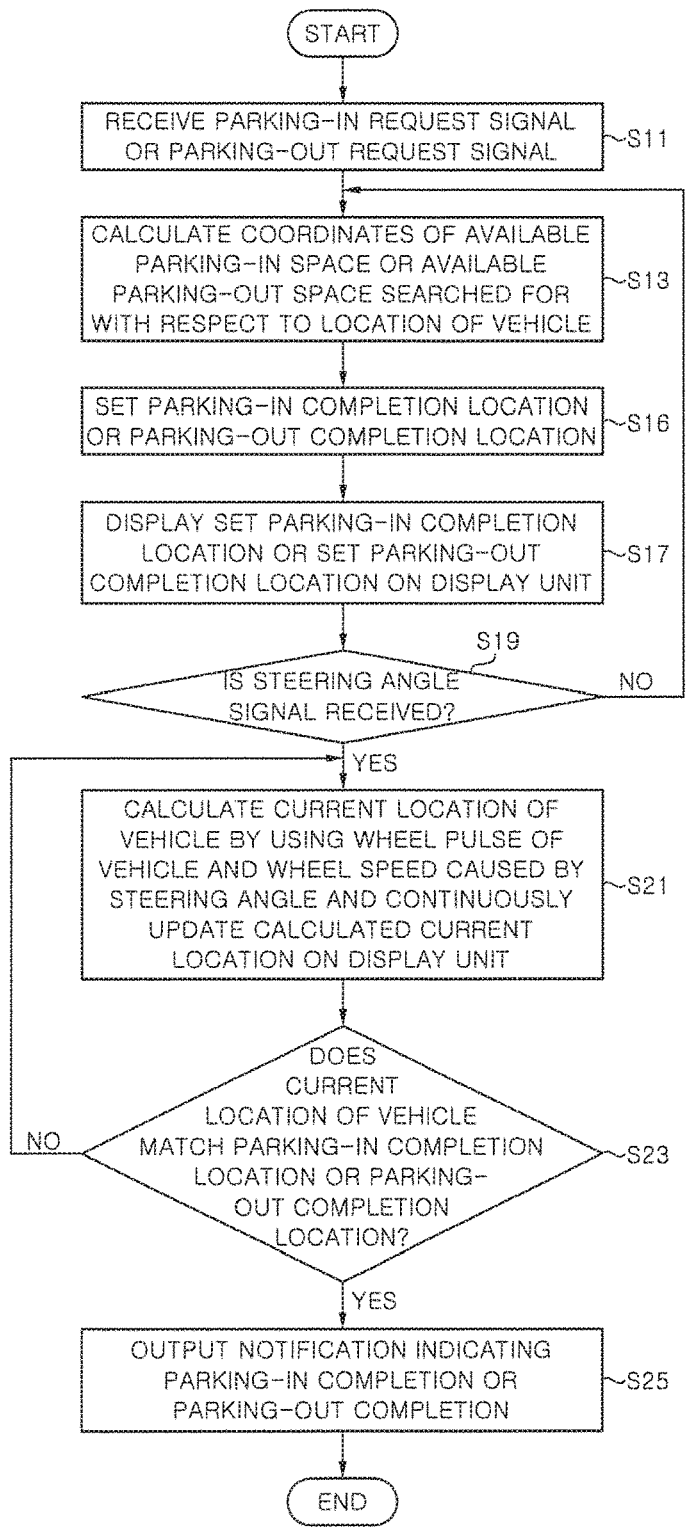
FIG. 4 is a flowchart of a driving assistance method using a driving assistance device according to another embodiment of the present invention.

FIG. 4 is a flowchart illustrating a driving assistance method using a driving assistance device, according to another embodiment of the present invention.

Referring to FIG. 4, the electronic control device 40 may receive a parking-in request signal or a parking-out request signal from the switch 30 installed in the vehicle (S11). The switch 30 may be a button for requesting parking-in or parking-out. Although it has been described that parking-in or parking-out is requested through the switch 30, the present invention is not limited thereto. The parking-in request signal or the parking-out request signal may also be received in a touch type through a screen of a terminal installed in the vehicle.

The electronic control unit 40 calculates coordinates of an available parking-in space or an available parking-out space searched for with respect to a location of the vehicle according to the parking-in request signal or the parking-out request signal received from the switch 30 (S13).

The electronic control unit 40 sets a parking-in completion location or a parking-out completion location by using a size of the available parking-in space or the available parking-out space and four corner points of the vehicle (S15). The parking-in completion location or the parking-out completion location is set by designating the four corner points of the vehicle and connecting the designated four corner points within coordinate values with respect to the size of the found available parking-in space or the found available parking-out space.

The electronic control unit 40 displays the set parking-in completion location or the set parking-out completion location on the display unit (S17).

After that, the electronic control unit 40 determines whether a steering angle signal according to automatic steering is received (S19).

As a determination result in operation S19, when the steering angle signal is not received, the electronic control unit 40 maintains a waiting state for a certain time, and then, returns the process to operation S13.

As a determination result in operation S19, when the steering angle signal is received, the electronic control unit 40 calculates a current location of the vehicle by using sensor signals received from a sensor installed in the vehicle, i.e., a wheel pulse and a wheel speed caused by a steering angle and continuously updates a location of the vehicle on the display unit (S21). The current location of the vehicle is coordinate information on the vehicle moved to the set parking-in completion location or the set parking-out completion location. An x value of the coordinate information is calculated through the wheel pulse and a y value and a θ value thereof are calculated through the wheel pulse and the steering angle.

The electronic control unit 40 determines whether the current location of the vehicle continuously updated as in operation S21 described above matches the parking-in completion location or the parking-out completion location set in operation S15 (S23).

As a determination result in operation S23, when the updated current location of the vehicle matches the set parking-in completion location or the set parking-out completion location, the electronic control unit 40 outputs notification information indicating parking-in completion or parking-out completion (S25). The notification information may be preset and may include information indicating that parking-in or parking-out is completed.

As a determination result in operation S23, when the updated current location of the vehicle does not match the set parking-in completion location or the set parking-out completion location, the electronic control unit 40 returns the process to operation S21 to update the current location of the vehicle on the display unit.

After that, the electronic control unit 40 may further determine whether the updated current location of the vehicle is within a boundary set based on the set parking-in completion location or the set parking-out completion location. When the current location of the vehicle is within the set boundary and a distance to an obstacle around the vehicle is within a preset reference distance, the electronic control unit 40 may change the current location of the vehicle into the parking-in completion location or the parking-out completion location described above and also output notification information indicating parking-in completion or parking-out completion.

Figure 5:
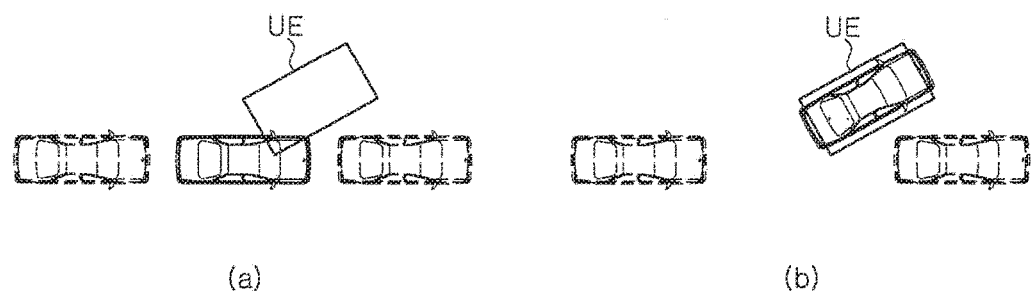
FIG. 5 is an example image for describing a driving assistance method during a parallel left parking-out control.

FIG. 5 is an example image for describing a driving assistance method during a parallel left parking-out control.

Referring to FIG. 5, the electronic control unit 40 sets a parking-out completion location UE as illustrated in FIG. 5A with respect to a location of a vehicle parked in a parking space. The parking-out completion location UE is a point within coordinate values corresponding to a size of an available parking-out space searched for with respect to the location of the vehicle. The parking-out completion location UE is set by connecting pieces of model information on the vehicle, i.e., coordinate points corresponding to four corner points of the vehicle with a line within the coordinate values corresponding to the size of the available parking-out space. After parking-out, the available parking-out space may be searched for as a point where a distance to an obstacle located around the vehicle is within a preset reference distance, or be searched for as a point where the vehicle is moved by a certain distance.

The location of the vehicle is updated to the parking-out completion location UE on the display unit as illustrated in FIG. 5A, and when the current location of the vehicle matches the parking-out completion location UE as illustrated in FIG. 5B, the electronic control unit 40 outputs notification information indicating that parking-out is completed. Therefore, the driver may easily recognize that full automatic parking-out is completed.

Figure 6:
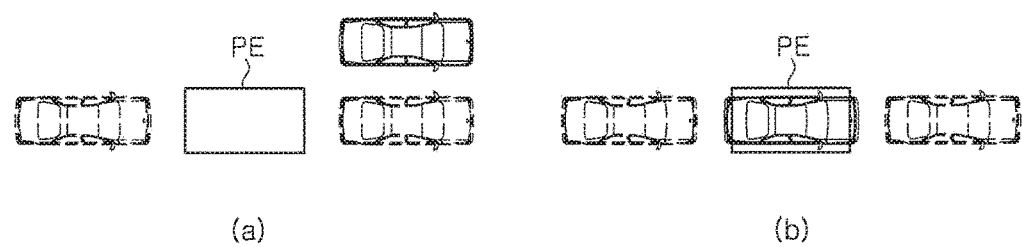
FIG. 6 is an example image for describing a driving assistance method during a parallel right parking-in control.

FIG. 6 is an example image for describing a driving assistance method during a parallel right parking-in control.

Referring to FIG. 6, the electronic control unit 40 searches for an available parking-in space with respect to a location of a vehicle, and sets a parking-in completion location PE as illustrated in FIG. 6A by using coordinates of the found available parking-in space. The parking-in completion location PE is a point within coordinate values corresponding to a size of the found available parking-in space. The parking-in completion location PE is set by connecting pieces of model information on the vehicle, i.e., coordinate points corresponding to four corner points of the vehicle with a line within the coordinate values corresponding to the size of the available parking-in space.

Figure 8:
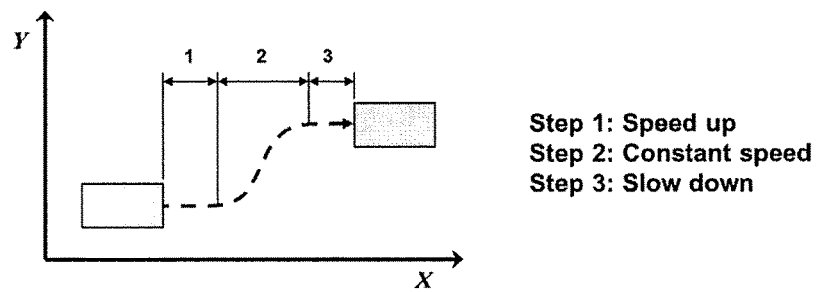
FIG. 8 illustrates a line path and a curved path between a current location and a target location of a vehicle.

Commonly, in order to design a parking locus, a line path and a curved path between a current location (x, y, and θ) of the vehicle and a target location (x_G, y_G, and θ_G) thereof are designed and are connected to each other as shown in FIG. 8.

Figure 9:
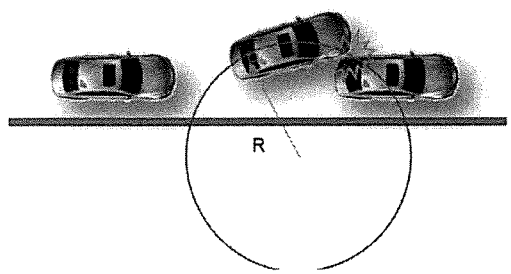
FIG. 9 is an exemplary image illustrating a collision occurrence in relation to a turning radius of a vehicle.

However, when a path is designed by simply taking into account a turning radius through a relation between material points, a collision may occur due to an appearance shape of the vehicle as shown in FIG. 9. Therefore, there is a need for a collision determination algorithm determining whether a collision occurs, by taking into account the appearance shape of the vehicle in addition to location information on the vehicle. That is, in the case described above, there is a need for an operation of confirming a path by checking whether a front right corner point of the vehicle collides with an object. In the case of corner points of the vehicle, an offset value with respect to a location position of each of corners is extracted with respect to a rear wheel center point, i.e., a center of an own vehicle model through the appearance shape of the vehicle and is used.

The location of the vehicle is updated to the parking-in completion location PE on the display unit as illustrated in FIG. 6A, and when the current location of the vehicle matches the parking-in completion location PE as illustrated in FIG. 6B, the electronic control unit 40 outputs notification information indicating that parking-in is completed.

FIG. 5 illustrates an example of the parallel left parking-out control and FIG. 6 illustrates an example of the parallel right parking-in control, and descriptions of the parallel left parking-out control and the parallel right parking-in control may be identically applied to parallel left parking-in/parking out control, parallel right parking-in/parking out control, right angle front parking-in/parking out control, and right angle rear parking-in/parking out control.

As described above, the driver is allowed to know when full automatic parking-in or full automatic parking-out is completed, by displaying the parking-in completion location or the parking-out completion location set with respect to the location of the vehicle on the display unit, updating the current location of the vehicle moved to the parking-in completion location or the parking-out completion location, and providing notification of the parking-in completion or parking-out completion when the updated current location of the vehicle matches the parking-in completion location or the parking-out completion location, thereby solving existing inconvenience according to full automatic parking-in or full automatic parking-out.

According to embodiments of the present invention, a driver is allowed to recognize a real-time path of a vehicle and parking-in completion or parking-out completion by outputting a location of the vehicle and a location of a target space to the driver and providing notification of parking-in completion or parking-out completion when the location of the vehicle is within a preset reference range with respect to the location of the target space searched for with respect to the location of the vehicle.

In addition, according to embodiments of the present invention, a collision between a vehicle and an obstacle may be prevented by additionally outputting an alarm when a distance to the obstacle around the vehicle from the vehicle moved to a target space is within a preset reference distance.

Furthermore, according to embodiments of the present invention, when a location of a vehicle is not within a preset reference range with respect to a location of a target space and a distance to an obstacle around the vehicle is within a preset reference distance, a current location of the vehicle may be changed into the location of the target space, thereby reducing a time required to complete parking-in or parking-out.

According to embodiments of the present invention, when a location of a vehicle matches a location of a target space, a color of an indicator indicating the location of the target space may be changed, thereby improving visibility of a driver and allowing the driver to easily recognize a situation.

While the embodiments of the present invention have been described with reference to the specific embodiments, it will be apparent to those skilled in the art that various changes and modifications may be made without departing from the spirit and scope of the invention as defined in the following claims.

| DESCRIPTION OF REFERENCE NUMERALS | |
|---|---|
| 10: front sensing unit | 20: rear sensing unit |
| 30: switch | 40: electronic control unit |
| 50: HMI | 60: brake control device |
| 70: steering control device | 75: speaker |
| 80: engine control unit | 90: AHB |
| 95: AVM | |

What is claimed is:

1. A driving assistance device comprising:
a space searching device configured to search for a target space around a vehicle with respect to the vehicle;
a space information acquisition device configured to acquire a location of the vehicle and a location of the target space;
an obstacle sensing device configured to sense an obstacle around the vehicle; and
an output device configured to output the location of the vehicle and the location of the target space to a driver,
wherein, when an automatic steering function is operated, the output device updates and outputs a current location of the vehicle on a certain cycle, preferably, in real time until the location of the vehicle matches the location of the target space, and
wherein, when the location of the vehicle is not within a preset reference range with respect to the location of the target space and the distance to the obstacle around the vehicle is within the preset reference distance, the space searching device changes the current location of the vehicle into the location of the target space.

2. The driving assistance device according to claim 1, wherein the output device outputs the current location of the vehicle and the location of the target space so as to overlap a top view image displayed on a display screen.

3. The driving assistance device according to claim 1, wherein, when the location of the vehicle is within a preset reference range with respect to the location of the target space, the output device outputs movement completion notification.

4. The driving assistance device according to claim 1, wherein, when the location of the vehicle matches the location of the target space, the output device changes and outputs a color of an indicator indicating the target space on a display screen.

5. The driving assistance device according to claim 1, wherein the space information acquisition device acquires the location of the target space by designating four corner points of the vehicle and connecting the designated four corner points within coordinate values corresponding to a size of the target space.

6. The driving assistance device according to claim 1, wherein the space information acquisition device acquires the current location of the vehicle based on a wheel pulse and a wheel speed caused by a steering angle of the vehicle moved to the target space.

7. The driving assistance device according to claim 1, wherein the output device additionally outputs an alarm when a distance to the obstacle around the vehicle from the vehicle moved to the target space is within a preset reference distance.

8. A driving assistance device comprising:
a space searching device configured to search for a target space around a vehicle with respect to the vehicle;
a space information acquisition device configured to acquire a location of the vehicle and a location of the target space;
an obstacle sensing device configured to sense an obstacle around the vehicle; and
an output device configured to output the location of the vehicle and the location of the target space to a driver,
wherein, when an automatic steering function is operated, the output device updates and outputs a current location of the vehicle on a certain cycle, preferably, in real time until the location of the vehicle matches the location of the target space,
wherein the space information acquisition device acquires the current location of the vehicle based on a wheel pulse and a wheel speed caused by a steering angle of the vehicle moved to the target space, and
wherein, when the location of the vehicle is not within a preset reference range with respect to the location of the target space and the distance to the obstacle around the vehicle is within the preset reference distance, the space searching device changes the current location of the vehicle into the location of the target space.

* * * * *